UNITED STATES PATENT OFFICE.

PHILOMELA T. VINING, OF SPRINGFIELD, ASSIGNOR TO HERSELF AND CHARLES A. WAKEFIELD, OF PITTSFIELD, MASSACHUSETTS.

IMPROVEMENT IN PRESERVING NATURAL FLOWERS.

Specification forming part of Letters Patent No. 116,375, dated June 27, 1871.

*To all whom it may concern:*

Be it known that I, PHILOMELA T. VINING, of Springfield, in the county of Hampden and State of Massachusetts, have invented a new and useful Improved Process for Preserving Natural Flowers; and I do hereby declare that the following is a full, clear, and exact description thereof.

For one class of flowers, such as pansies, tea roses, fuchsias, heliotrope, geraniums, &c., I first take a quantity of coarse gravel, say two quarts, the whitest being the best, and wash it in soft water until it is quite clean and entirely free from dirt and fine sand. Then put it in a glass or earthen vessel and pour upon it about one-fourth of an ounce of hydrochloric acid diluted with about one pint of pure soft water. Stir it frequently and let it soak about half an hour, then pour off the acid water and spread out the gravel to dry. This preparation of the gravel is new, and the acid has the effect of preserving the natural color better than by any other treatment. When the gravel is dry and warm spread a layer of it, say half an inch deep, in a pasteboard or other convenient box, lay the flower thereon, and then carefully the gravel about and over the flower until it is entirely covered and the petals all remain in proper shape. Place the box in a warm, dry, and dark place, where the temperature will be steady at about 80° or 90°, and let it remain two or three days, or until dry, and then remove the flowers from the gravel and strengthen or stiffen each petal by putting on one side of it a thin layer of paraffine or wax, or some similar substance. This may be done by melting the wax or other substance and applying it with a brush. In some cases, however, the petals may be strengthened by pressing upon one side a thin sheet of wax of the same color as the flower, or by fastening on such sheets with mucilage or glue. This process of strengthening the flowers to keep them in shape and prevent their falling to pieces is another feature which is new and important.

Some flowers which have many petals, such as a rose, for instance, I treat in the following manner: Make a book of white muslin, soak it in the acid water, prepared the same as for the gravel, and dry it; remove the petals and lay them separately between the leaves of this muslin book, and put a weight thereon sufficient to keep them smooth, and put them in a warm and dark place, and when dry fasten them on a thin sheet of wax either by pressure or by means of mecilage or glue; then form them into the proper shape and put them together as wax flowers are made.

A class of white flowers, including camelias, tuberoses, pinks, bogonias, balsams, and other juicy flowers, should be treated thus: They should first receive a bath of lime-water, containing about one tea-spoonful of lime-water to about one pint of pure soft water, and should remain in this until they begin to look transparent. They should then be removed and put into another bath containing about fifty drops of hydrochloric acid to one pint of water, and left therein from one to three hours, or until they look bright and clear; then rinse them well in soft water and spread between two sheets of clean white muslin, and lay them in a warm book to dry; then strengthen them with wax as before.

Juicy flowers that are colored should be treated thus: Omitting the lime-water bath, they should receive the acid bath only, and remain in it until they begin to look transparent; then remove them at once, rinse them, and place them in clean muslin to dry.

Small flowers should not be taken to pieces, but may be treated thus: Take a small basket, line it with muslin, and pack the flowers therein with gravel, as in the other instance, and then put the basket in the baths as above; then hang the basket in a warm place, and, when dry, these flowers may be stiffened by the paraffine or wax with a small camel's-hair brush.

White roses are the most difficult flowers to preserve, as they have a strong tendency to turn brown. I first give them a bath of lime-water, as above; then a bath of chlorine water made of about a pint of water to about ten drops of chlorine; the "bleaching-liquid" answers very well, also chloride of lime-water, stearic acid, oxalic acid; or chlorinated water, made by thoroughly impregnating water with chlorine gas, would also answer. I prefer, however, to use the chlorine-water, or chlorinated water, as the safest under all circumstances. Let the flowers remain one hour in this bath, and then add about twenty drops of hydrochloric acid, and let them remain about an hour, or until they look perfectly white, then rinse them in warm pure soft water, and dry them between pieces of muslin.

The flowers should be kept in an air-tight receiver, which should be kept dry and filled with hot air before placing it over the flowers, and the preservation is still more perfect if a little chlorine gas is admitted before it is sealed.

Having thus described my invention, what I claim as new, and desire to secure by Letters Patent, is—

The process of preserving natural flowers, substantially as herein described and set forth.

PHILOMELA T. VINING.

Witnesses:
Z. F. CHASE,
S. A. CHASE.